United States Patent [19]

Hanlon

[11] Patent Number: 4,490,066
[45] Date of Patent: Dec. 25, 1984

[54] CLAMPING SYSTEM FOR HEAVY "I" BEAMS AND THE LIKE ON OIL RIGS, ETC.

[76] Inventor: Jim C. Hanlon, 4545 McArthur Blvd., Apt. #51, New Orleans, La. 70114

[21] Appl. No.: 411,465

[22] Filed: Aug. 25, 1982

[51] Int. Cl.$^3$ ............................................. F16B 1/00
[52] U.S. Cl. ................................. 403/387; 403/384; 403/400; 52/665
[58] Field of Search ............... 403/387, 400, 384, 386, 403/396; 52/719, 665

[56] References Cited

U.S. PATENT DOCUMENTS

| | | | |
|---|---|---|---|
| 2,876,048 | 3/1959 | McCormick | 403/54 X |
| 3,144,105 | 8/1964 | Capek | 403/387 |
| 3,467,418 | 9/1969 | Redditt | 403/188 X |
| 3,591,214 | 7/1971 | Gallay | 403/407 X |
| 4,289,417 | 9/1981 | Mandell | 403/400 X |
| 4,379,651 | 4/1983 | Nagashima | 403/387 |

Primary Examiner—Andrew V. Kundrat
Assistant Examiner—Joseph A. Fischetti
Attorney, Agent, or Firm—Mason, Fenwick & Lawrence

[57] ABSTRACT

A clamping system for "temporarily" fixedly joining together two "I" beam or girder type structures on for example an offshore oil rig to set up for example a portable crane on the platform structure. The system uses four sets of opposed pairs of clamping elements, each set of which includes two related pairs of clamping elements which grip the beams and are bolted together, the clamping system being used in place of welding the beams or girders together. When it is time to move the structure, the clamping elements are merely unbolted, allowing the removal or replacement of the portable crane on the platform structure. The four clamping elements of each set include two pairs of side-by-side members which are positioned along side one another to grip the opposite edges of the top flange of the bottom, support beam and bear down on the upper surface of one side of the bottom flange of the upper, crane girder. The other, opposed pair of clamping elements, located on the opposite side of the crane beam is also positioned along side one another to grip the opposite edges of the top flange of the bottom, support beam and bear down on the upper surface of the opposite side of the bottom flange of the upper, crane girder. Each clamping element includes moveable griping means, such as for example setting or bearing bolts, which are tightened down on the various beam flanges, locking the clamping elements to the beam flanges. The clamping elements are all then bolted together, "fixedly" locking the crane girder to the platform skid beam. An another application of the present invention is the mounting of a crane structure on the beam structure of a building construction site.

9 Claims, 8 Drawing Figures

4,490,066

CLAMPING SYSTEM FOR HEAVY "I" BEAMS AND THE LIKE ON OIL RIGS, ETC.

BACKGROUND OF THE INVENTION

1. Field of the Invention

The present invention relates to clamping two structures together, particularly two large, heavy structural elements, such as "I" beams and the like. More particularly, the present invention relates to a multi-element system for fastening a relatively temporary, heavy structure, such as for example a portable crane, to a basic support structure, such as for example the skid beams of an offshore oil rig or the support beams of a building construction site.

2. Prior Art

There is a need in the offshore oil rig industry to mount for operative use relatively large structures bearing great loads, such as for example a portable crane, onto the rig structure and particularly the rig's skid beams. The bottom structure of the portable crane usually includes two, fixed base girders which are rested on the support skid beams, perpendicular thereto, and in the prior art were welded to the skid beams after the crane had been properly located on the skid beams.

Such an operation would normally take a crew of four welders, three riggers or helpers, and a foreman five to ten hours to do the welding. Also, generally a welding crew is not available on the rig and must be brought in from the shore, a process which normally takes about twenty-four to thirty hours. Upon completion, the welding had to be ultra-sonicly tested for weld integrity. Additionally, while the welding operation was going on, the rig would be shut down. All of these factors have caused such a prior art operation to be very expensive. Finally, when it came time to relocate or remove the portable crane, it would take a crew one-half to three-quarters of the weld-up time to break the crane away from the skid beams.

In contrast, the clamping system of the present invention can be installed by two workers in approximately forty-five minutes and removed in a like period of time. Additionally, the clamping elements are relatively simple in structure and highly reliable, and can be built in practically any machine shop, and thus are relatively inexpensive.

Another exemplary, heavy load application to which the present invention is directed is in the building trade industry in setting up for example stiff leg, high rise cranes.

With respect to broadly clamping two, orthogonal, elongated items together, U.S. Pat. No. 3,591,214 to Gallay issued July 6, 1971 discloses a "Connection System for Steel Beams" which joins two "I" beams together by welding one of the joining elements to one beam and clamping the other end to the other beam with the use of bolted elements. The structure illustrated would not have the structural integrity or strength to withstand the loads that take place in the heavy structural art of the present invention. Additionally, welding is required, and relatively critical placement of the joining and clamping elements is necessary.

Two patents which disclose clamping structures for joining two orthogonal pipes or tubes in "C" shaped or "V" shaped seats are U.S. Pat. Nos. 2,088,890 (Winby et al issued Aug. 3, 1937) and 4,289,417 (Mandell issued Sept. 15, 1981).

Additional prior patents which may be of general background interest are listed below:

| U.S. Pat. No. | Patentee(s) | Issue Date |
| --- | --- | --- |
| 2,876,048 | J. McCormick | March 3, 1959 |
| 3,467,418 | J. R. Redditt | September 16, 1969 |

3. General Discussion of the Invention

The present invention overcomes the relatively expensive and time consuming "welding" approach of the prior art with a straight-forward clamping system which includes four sets of two pairs of opposed clamping elements, which clamp together two, spaced, crane bearing beams to two, spaced, skid or support beams at four, spaced, end locations. Each related pair of clamping elements clamps one side of the flange of the upper, crane beam to the flange of the lower support beam, with the opposing, related pair clamp the other side of the upper flange to the lower flange.

Each pair straddles the lower, support beam flange and holds the lower flange in two opposed, horizontally disposed U-shaped areas and includes outboard, overlying plates which overlie the upper, crane beam flange. The clamping elements also have moveable gripping means, are actuated by threaded bolts which grip and lock the clamping elements to the two, opposed beam flanges of the crane and support beams, clamping the beams together.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein.

DETAILED DESCRIPTION OF THE PREFERRED EMBODIMENT(S)

Figure 1:
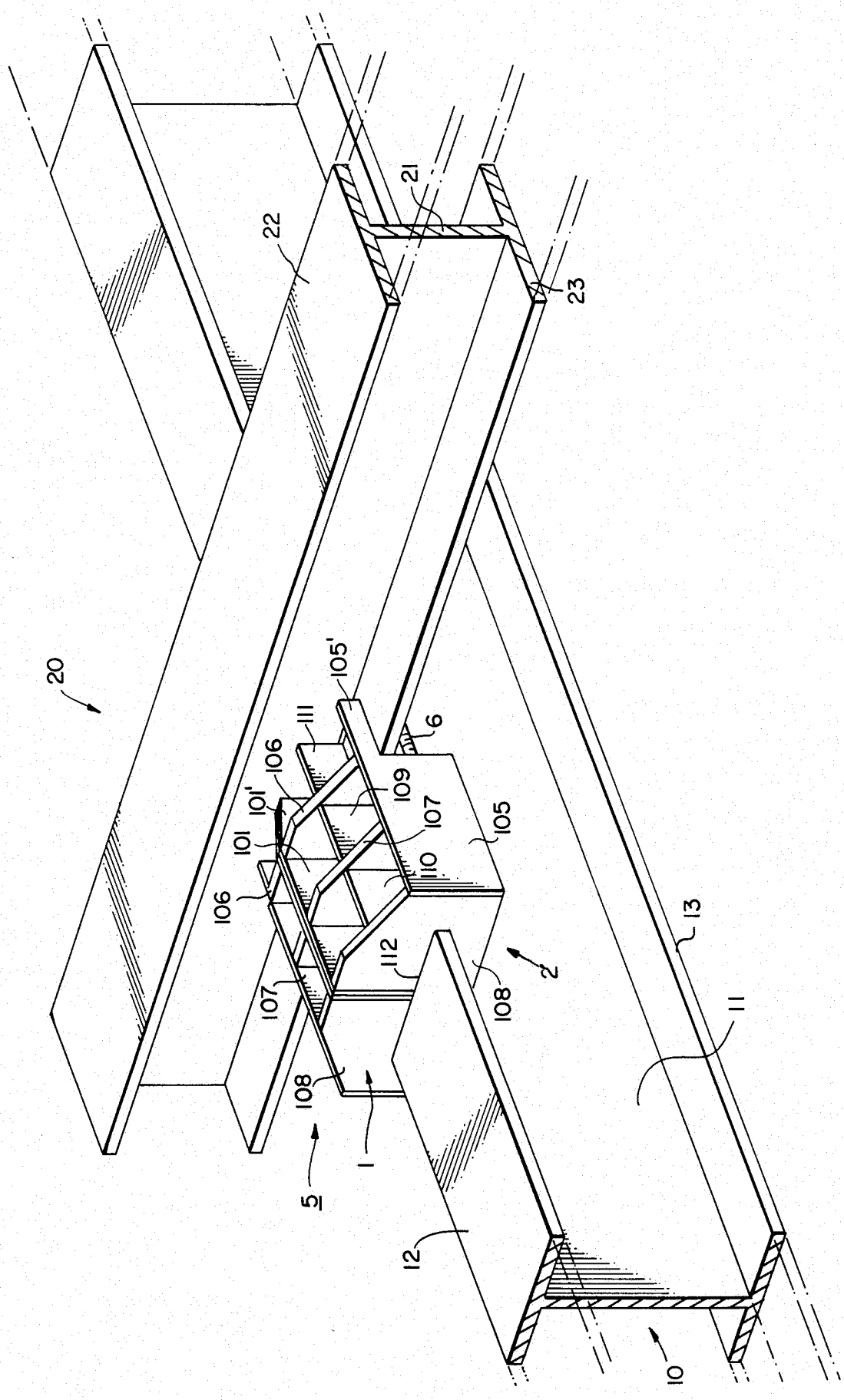
FIG. 1 is an isometric view of the preferred embodiment of the clamping system of the present invention in use holding the two orthogonal beams or girders together, with one pair of coupling members being visible and with the other pair being substantially identical but oppositely disposed but unseen on the opposite side of the upper beam.

As can be seen in FIG. 1, the preferred embodiment of the clamping system of the present invention includes a set of at least two, horizontally disposed, load bearing, very heavy, structural "I" beams 20 carrying and fixed to the underside of a crane or the like, with the load bearing beams 20 resting on at least two horizontally disposed, very heavy, structural, support "I" beams 10, which can for example be the skid beams on an oil rig or for further example the structural beams on a building construction site. Each support beam 10 includes a vertical member 11 integrally connected to and between the horizontal flanges 12, 13. Likewise, each load bearing or crane beam 20 includes a vertical member 21 integrally connected to and between horizontal flanges 22, 23. The crane beams 20 rest on and are carried by the skid beams 10, with the upper flange 23 being disposed in face-to-face engagement with the lower flange 12.

The skid beams 10 are usually welded-up, man-made girders with the thickness of the horizontal flange plates being for example one and three-quarters inch thick and fourteen to seventeen inches across. The crane beams 20 are typically stock girders twelve inches across the horizontal flange plates 22, 23, with the vertical member 21 being typically thirty-six inches in height, with the beam typically weighing one-hundred-and-sixty to three-hundred lbs. per linear foot.

There are included at least four clamping assemblies 5 for clamping the crane beams 20 to the skid beams 10. Each clamping assembly 5 comprises two pairs of flanged coupling members 1 and 2 of which one pair is illustrated in FIG. 1. The other coupling member pair which is not shown in FIG. 1 would be on the other side of beam 20 and would be engaged with flange 23 of beam 20 and flange 12 of beam 10 in the same manner as the coupling members 1 and 2 illustrated in FIG. 1.

The second pair of coupling members 1 and 2 that are not shown in FIG. 1 are identical to the coupling members 1 and 2 shown in FIG. 1 and engage the I beam manners in exactly the same manner but face in a different direction along the length of beam 10 in a mirror-like relation to members 1 and 2. The four clamping assemblies which are employed for attaching a crane or the like to beams 10 are all identical and are employed at spaced locations usually at the end portions of the crane beams 20 so that the crane is fixedly connected to the support beams at four spaced positions to provide optimum stability. In operation, one pair of the coupling members 1, 2 clamps one edge of the lower flange 23 of beam 20 to the upper flange 12 of beam 10 while the other pair clamps the other side of the flange 23 to the other side of lower flange 12. The coupling members 1, 2 illustrated in FIG. 1 are connected to the opposing pair of coupling members (non-illustrated) by horizontally extending spaced threaded bolt members 6.

In each of the clamping assemblies 5 the clamping members 1 and 2 are structurally identical, except one is the "mirror-image" of the other. In the interest of brevity, the preferred embodiment of the coupling member 1 will hereinafter be described in detail, with the understanding that all of the other fifteen coupling members are totally identical to or at least substantially identical to, but being mirror-images of, the coupling member 1.

Figure 3:
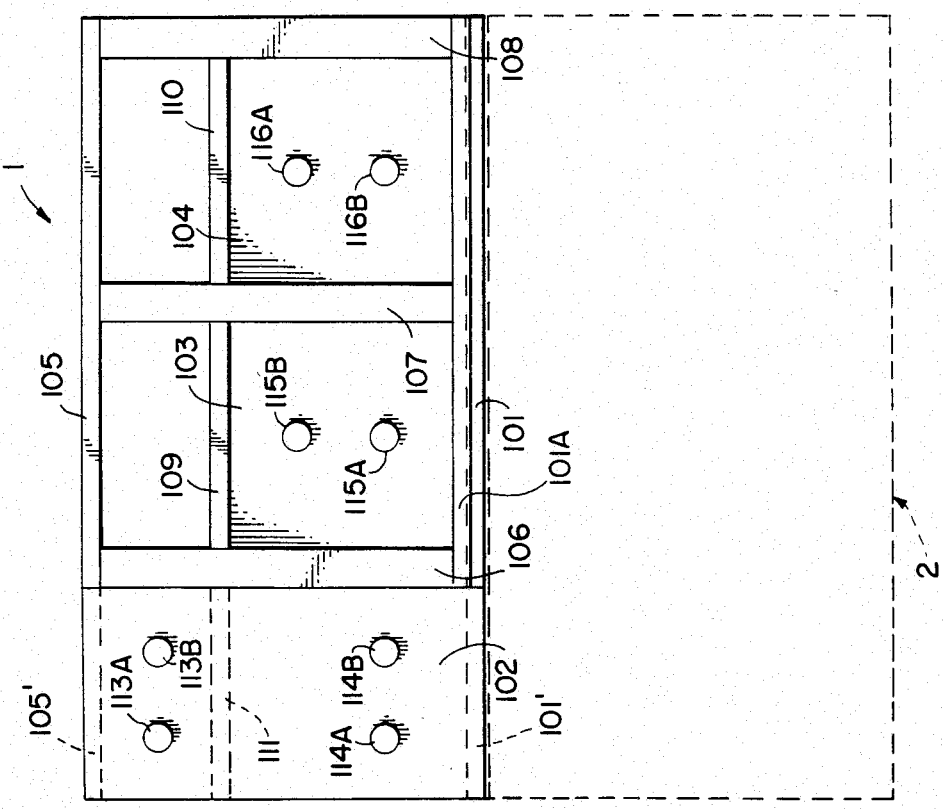
FIG. 3 is a plan, bottom view of one of the other clamping elements with its front facing element shown in phantom line.
Figure 2:
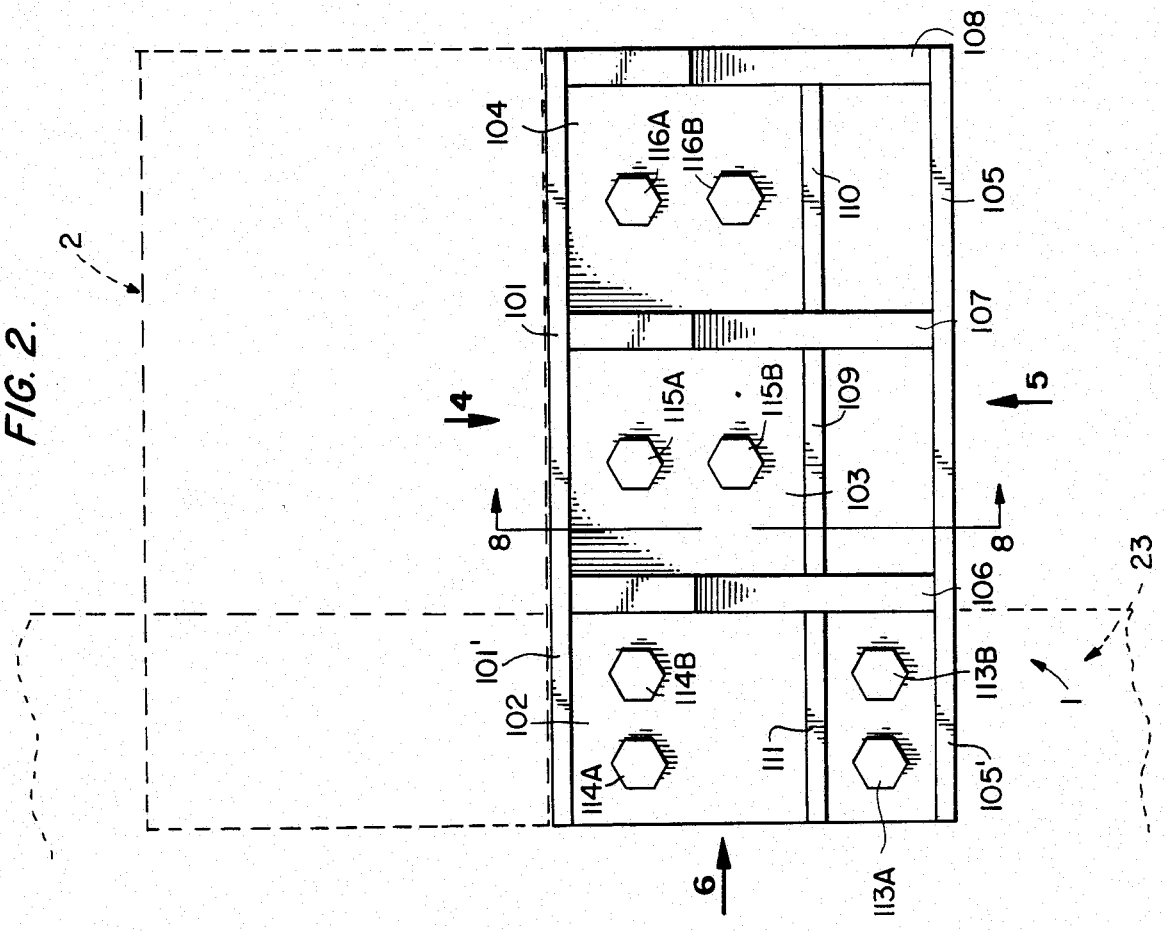
FIG. 2 is a plan, top view of one of the coupling members with its front facing element shown in phantom line.
Figure 7:
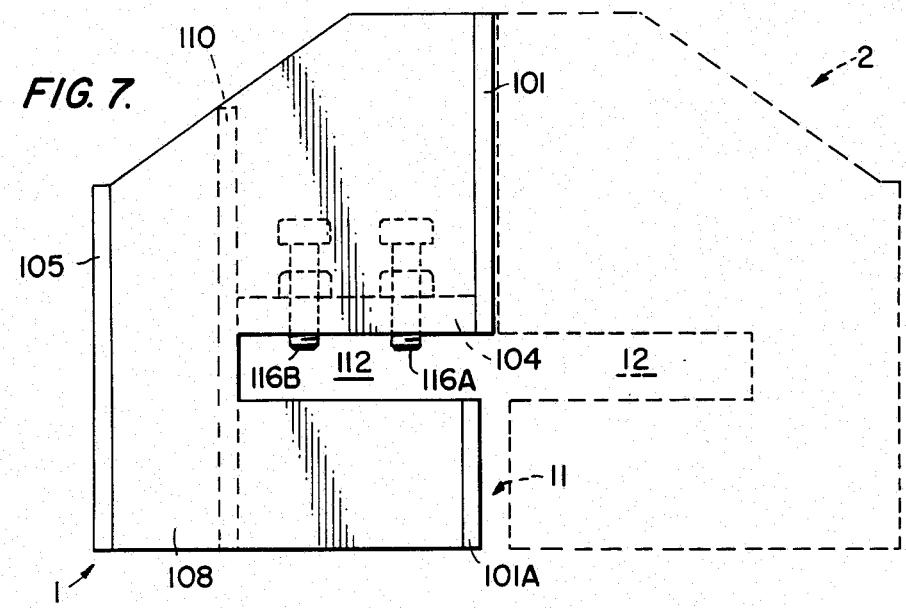
FIG. 7 is an elevational view of the coupling member of FIG. 2 taken from the perspective of perspective arrow 7, with the opposite coupling member shown in phantom line.

As can be seen in the top and bottom views of FIGS. 2 and 3, the coupling member 1 which includes longitudinally extending plate means comprising an upper inboard vertical side plate 101 (FIGS. 2 and 3) having a lower edge resting on flange 12, an outboard vertically disposed side plate 105 and a lower inboard side plate 101A (FIG. 7). Plates 101, 101A and 105 are in parallel spaced planes and plates 101 and 105 are connected by C-shaped parallel transverse vertical plates 106, 107 and 108. Plates 106, 107 and 108 are all provided with a slot 112 (FIG. 7) so as to fit over flange 12.

Figure 6:
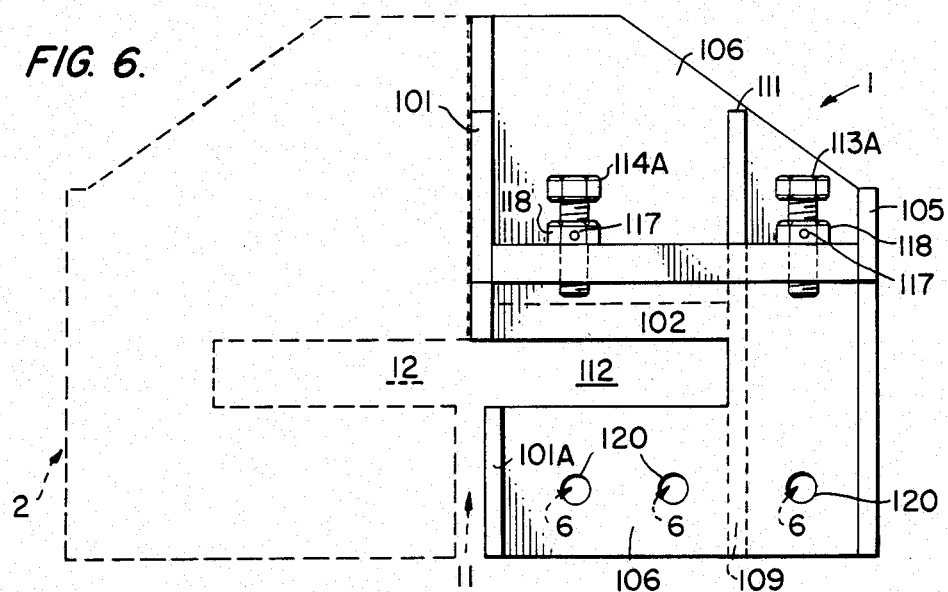
FIG. 6 is an elevational view of the coupling member of FIG. 2 taken from the perspective of perspective arrow 6, with the opposite coupling member shown in phantom line.

Plates 101 and 105 respectively include cantilever extensions 101' and 105' which, along with a separate medial cantilever plate 111 extend over flange 23. A plate 102 (FIG. 6) is secured to the lower edges of plates 101', 111 and 105'. Horizontal plates 103 and 104 are provided in a common plane and horizontal plate 102 having threaded apertures in which vertically movable threaded lower flange clamp bolts 113A, 113B, 114A and 114B are received is at a higher elevation. Similarly, horizontal plate 103 has threaded apertures which receive vertically movable threaded upper flange clamp bolts 115A and 115B while horizontal plate 104 has threaded apertures receiving 116B. Vertically movable lower flange clamp bolts 113A, 113B, 114A and 114B are positioned over lower flange 23 while upper flange clamp bolts 115A, 115B, 116A and 116B are positioned over upper flange 12.

A first vertical internal plate 109 is welded between plates 106 and 107 and a second vertical internal plate 110 is welded between plates 107 and 108 as best shown in FIG. 1. Medial cantilever plate 111 is in alignment with plates 109 and 110.

Figure 4:
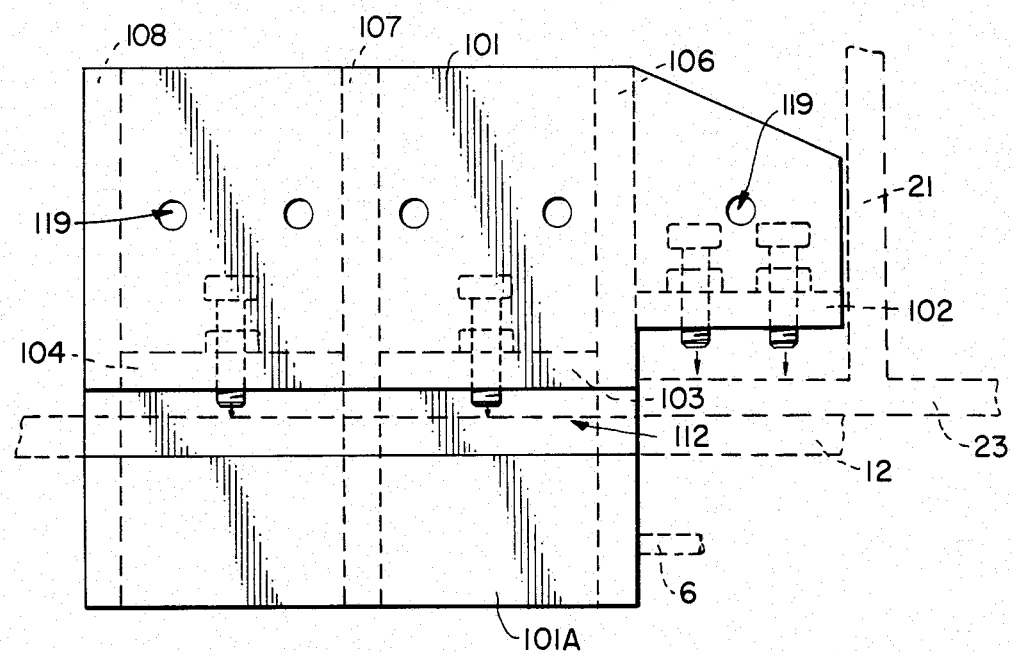
FIG. 4 is an elevational view of the coupling member of FIG. 2 taken from the perspective of perspective arrow 4.
Figure 5:
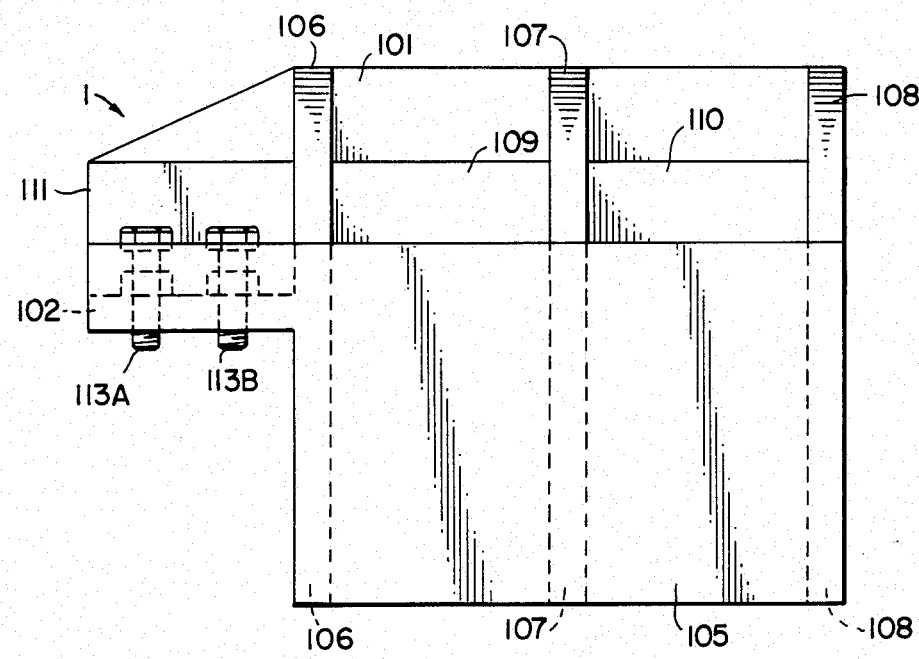
FIG. 5 is an elevational view of the coupling member of FIG. 2 taken from the perspective of perspective arrow 5.
Figure 8:
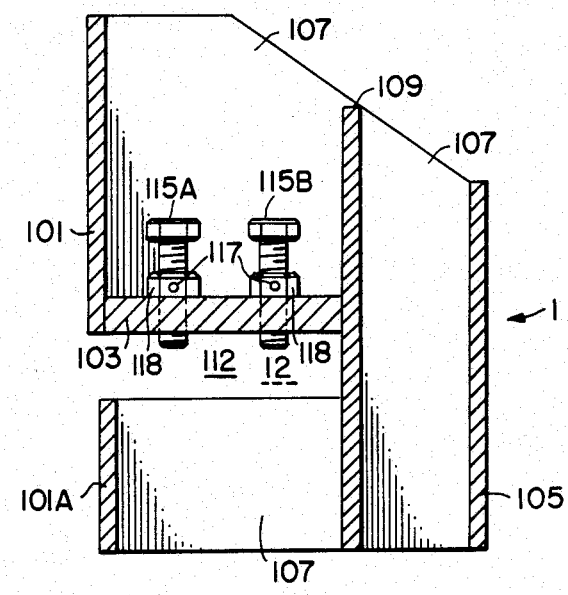
FIG. 8 is a cross-sectional view of the coupling member of FIG. 2 taken along sectional lines 8—8.

As can best be seen in FIGS. 4 and 7, the side of the coupling member 1 which faces the juxtaposed clamping element 2 is made up of vertically disposed plates 101 and 101A, with the latter being laterally off-set (note FIG. 7) to accommodate one-half the thickness of the largest size of the beam vertical member 11 with which the coupling member 1 will be used. Additionally, as can best be seen in the views of FIGS. 7 and 8, the coupling member 1 includes a horizontally disposed U-shaped area 112 for holding in griping engagement the lower beam flange 12. (Note also FIG. 4.) As seen in FIG. 4, a series of holes 119, which can be circular as illustrated or slotted to allow for some play, are included in the wall 101 to allow bolts (not illustrated) to pass through in order to allow the adjacent, juxtaposed, side-by-side coupling members 1 and 2 to be connected together for added strength in the combined clamping system.

A series of movable clamp means are included in the horizontally disposed plates 102, 103, 104 to movingly engage the upper and lower beam flanges 23, 12. In the preferred embodiment illustrated, these clamp means comprise sets of threaded clamp bolts 113A/113B, 114A/114B for the beam flange 23 and 115A/115B, 116A/116B for the beam flange 12. The threaded clamp bolts threadably engage the threaded openings in the horizontally disposed plates through which they extend, as well as the nuts 118 which are welded to the horizontally disposed plates. The fixed, welded nuts 118 include grease fittings 117 to help prevent corrosion and freezing of the bolts 113A, 113B, 114A, 114B, 115A, 115B, 116A and 116B, while the beams 10, 20 are clamped together over relatively long periods of time.

Because of the great structural forces incurred in the use of the present invention, the coupling member 1 is made of high strength material such as for example steel plates of for example quarter or half inch thickness.

In use, the first pair of coupling members 1, 2 is mounted side-by-side in juxtaposition on the lower beam flange 12 with the opposite edges of the flange 12 located in the opposed U-shaped areas 112 and with the outboard horizontally disposed plates 102 overlying the upper surface of one side of the upper beam flange 23. The bolts 113A, 113B, 114A, 114B, 115A, 115B, 116A and 116B are then tightened down until the side edge of the upper beam flange 23 is tightly clamped down onto the lower beam flange 12. The first pair 5 can then be connected by bolting them together through holes 119.

In like but opposing fashion the second pair of coupling member is positioned on the lower beam flange 12 on the opposite side of the crane beam 10 from the first pair, with their outboard horizontally disposed plates 15 overlying the upper surface of the opposite side of the upper beam flange 23. Their gripping bolts are then tightened down until its respective, opposite side of the upper beam flange 23 is tightly clamped to the lower beam flange 12. The coupling members of the second pair can then be bolted together if desired by bolting them through the holes 119. Additionally, the first pair 5 can then be bolted to the second pair by bolting them together with the bolts 6 through the bolt holes 120 shown in FIG. 6.

Thus, the crane beam 20 is clamped to the skid or support beam 10 at an initial clamping point. The same process is then repeated at the other end portion of the crane beam 20 with the second set of clamping elements. Finally at least the other crane beam at the other side of the crane is clamped down at its two end portions to the support beams 10 using the third and fourth sets of coupling members, until the crane has been clamped down at its four end points to the support beams.

When it is time to move the crane from the support beam 10, the foregoing process is merely reversed. The crane or other like load can then be removed from or repositioned on the oil rig. Or, if on a building construction site, the crane can then be moved up to the next desired level and reclamped on the support beams located at that level, etc., until the crane is no longer needed, at which time it is unclamped and removed.

It should be understood that the foregoing described embodiment is merely exemplary, and many changes in structure and approach are possible. For example each pair of clamp elements could be made in one integral structure; other types of griping means could be used in place of the bolts 113-116, such as for example moveable hooks, etc.; a clamp designed to clamp the upper one 22 of the beam flanges 22, 23 to the desired one of the lower flanges 12 or 13 is possible, although a clamp which clamps the adjacent flanges 12 and 23 is preferred from a compactness and simplicity standpoint; the griping bolts 114 and 116 could be located in the lower part of the U-shaped area 112; rather than have a clamping element in a rectangular configuration, an "L" shaped configuration could be used; etc., etc.

Also, it should be understood that the use of "horizontal" and "vertical" references herein are not usually meant in the absolute sense with respect to the earth's surface, but rather in a relative or reference-point sense of for example one element being located at ninety degrees to the other.

Because many varying and different embodiments may be made within the scope of the invention concept herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A clamping system for clamping together angularly intersecting, upper and lower horizontally disposed, heavy, structural "I" beams, each having two horizontal flanges between a vertical member with the upper one of said beams resting on the lower beam with the upper flange of the lower beam contacting the lower flange of the upper beam in face-to-face disposition, said system comprising:

a pair of coupling members each releaseably connectable to said upper and lower beams for clamping together the upper horizontal flange of said lower beam to the lower horizontal flange of the upper beam, each coupling member comprising:

a plurality of parallel transverse vertical plates of generally C-shaped configuration and including a slot dimensioned to fit over approximately one-half the width of said upper flange of said lower beam;

longitudinally extending plate means connected to said parallel transverse vertical plates and extending in a direction parallel to the axis of said lower beam;

horizontal bolt support plate means connected to said vertical plates in a location immediately above and adjacent said slots;

threaded bolt means threadably mounted in threaded apertures extending vertically through said horizontal bolt support plate means so as to be movable into forceful clamping contact with the upper surface of the upper flange of the lower beam;

longitudinally extending cantilever plate means extending over one side of the upper surface of the lower flange of the upper beam;

lower flange clamp bolt means mounted on said cantilever plate means for vertical movement into forceful clamping contact with the upper surface of the lower flange of said upper beam;

said coupling members of said pair being arranged on the upper flange of the lower beam in back-to-back mirror image relationship to each other and including connection permitting means for permitting said coupling members of said pair to be mechanically connected together; and further including a second pair of coupling members identical to said first pair of coupling members and mounted on the opposite side of the upper beam and on the upper flange of the lower beam in mirror relation to the first pair of coupling members.

2. The clamping system of claim 1 additionally including threaded connector means extending between said first pair of coupling members and said second pair of coupling members for urging said pairs of coupling members toward each other.

3. The clamping system of claim 2 wherein said parallel transverse vertical plates comprise an end plate, an outboard vertical end plate on the end of said coupling member opposite said end plate and a medial vertical connector plate positioned midway between and parallel to said end plate and said outboard vertical end plate.

4. The clamping system of claim 2 additionally including a second horizontal plate connected to the lower edges of said cantilever plate means and wherein said lower flange clamp bolt means are mounted in threaded apertures in said second horizontal plate.

5. The clamping system of claim 1 wherein said parallel transverse vertical plates comprise an end plate, an outboard vertical end plate on the end of said coupling member opposite said end plate and a medial vertical connector plate positioned midway between and parallel to said end plate and said outboard vertical end plate.

6. The clamping system of claim 5 additionally including a second horizontal plate connected to the lower edges of said cantilever plate means and wherein said lower flange clamp bolt means are mounted in threaded apertures in said second horizontal plate.

7. The clamping system of claim 4 wherein said second horizontal plate is at a higher elevation than said horizontal bolt support plate means.

8. The clamping system of claim 1 additionally including a second horizontal plate connected to the lower edges of said cantilever plate means and wherein said lower flange clamp bolt means are mounted in threaded apertures in said second horizontal plate.

9. The clamping system of claim 8 wherein said second horizontal plate is at a higher elevation than said horizontal bolt support plate means.

* * * * *